(12) United States Patent
Munawar et al.

(10) Patent No.: US 12,734,695 B2
(45) Date of Patent: Sep. 15, 2026

(54) COOPERATIVE USE OF AUTONOMOUS MACHINES

(71) Applicant: International Business Machines Corporation, Armonk, NY (US)

(72) Inventors: Asim Munawar, Demarest, NJ (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 180 days.

(21) Appl. No.: 18/352,381

(22) Filed: Jul. 14, 2023

(65) Prior Publication Data

US 2025/0021100 A1 Jan. 16, 2025

(51) Int. Cl.
*B25J 9/16* (2006.01)
*G05D 1/69* (2024.01)
(Continued)

(52) U.S. Cl.
CPC .......... *B25J 9/1679* (2013.01); *B25J 9/1682* (2013.01); *G05D 1/69* (2024.01); *G05D 1/6985* (2024.01);
(Continued)

(58) Field of Classification Search
CPC .. G05D 1/0287; G05D 1/0088; G05D 1/6985; G05D 1/656; B25J 9/1682;
(Continued)

(56) References Cited

U.S. PATENT DOCUMENTS

| | | | |
|---|---|---|---|
| 10,850,395 B2 | 12/2020 | Moses et al. | |
| 11,198,214 B2 | 12/2021 | Buerger et al. | |

(Continued)

FOREIGN PATENT DOCUMENTS

| | | | | |
|---|---|---|---|---|
| EP | 3731048 A1 * | 10/2020 | ....... G05B 19/41895 |
| JP | 2003291083 A * | 10/2003 | |
| WO | WO-2017045622 A1 * | 3/2017 | ............ G05B 19/04 |

OTHER PUBLICATIONS

WO 2017/045622 A1, Method of requesting help by device and responding to device help request, and device, Luo, Filed: Sep. 14, 2016 Pub: Mar. 23, 2017, English Translation (Year: 2017).*

(Continued)

*Primary Examiner* — Thomas E Worden
*Assistant Examiner* — Benjamin J Brosh
(74) *Attorney, Agent, or Firm* — Cantor Colburn LLP; Robert D. Bean

(57) ABSTRACT

Embodiments of the invention are directed to a computer-implemented method that includes analyzing an object to be manipulated by a primary autonomous machine, the analyzing including determining one or more operations to be performed to manipulate the object for a desired purpose. The method also includes, based on the analyzing, determining whether the primary autonomous machine has a capability sufficient to perform the one or more operations and realize the desired purpose, based on determining that the capability is not sufficient, requesting assistance from a secondary autonomous machine, and performing the one or more operations by the primary autonomous machine in cooperation with the secondary autonomous machine. Embodiments of the invention are also directed to computer systems and computer program products.

20 Claims, 4 Drawing Sheets

(51) Int. Cl.
*G05D 1/698* (2024.01)
*G05D 109/18* (2024.01)

(52) U.S. Cl.
CPC .............. *G05B 2219/31008* (2013.01); *G05B 2219/33055* (2013.01); *G05B 2219/39146* (2013.01); *G05B 2219/39147* (2013.01); *G05B 2219/39157* (2013.01); *G05B 2219/39163* (2013.01); *G05B 2219/39166* (2013.01); *G05B 2219/39172* (2013.01); *G05B 2219/39175* (2013.01); *G05B 2219/40299* (2013.01); *G05B 2219/40434* (2013.01); *G05D 2109/18* (2024.01)

(58) Field of Classification Search
CPC .................. B25J 9/1679; B25J 9/0084; G05B 2219/39146; G05B 2219/39147; G05B 2219/39157; G05B 2219/39163; G05B 2219/39166; G05B 2219/39172; G05B 2219/39175; G05B 2219/40434; G05B 2219/31008
See application file for complete search history.

(56) References Cited

U.S. PATENT DOCUMENTS

| | | | | |
|---|---|---|---|---|
| 2004/0162638 | A1 | 8/2004 | Solomon | |
| 2014/0342834 | A1 | 11/2014 | Tappeiner et al. | |
| 2015/0142249 | A1* | 5/2015 | Ooga | B66F 9/063 901/1 |
| 2016/0132059 | A1* | 5/2016 | Mason | B25J 9/1697 701/28 |
| 2016/0378108 | A1* | 12/2016 | Paczan | B64U 30/20 705/330 |
| 2017/0120443 | A1* | 5/2017 | Kang | G05D 1/0293 |
| 2019/0278295 | A1* | 9/2019 | Matsuno | B25J 9/0084 |
| 2019/0389575 | A1* | 12/2019 | Kirkbride | B64U 50/19 |
| 2020/0230805 | A1* | 7/2020 | Murali | B25J 9/009 |
| 2020/0282549 | A1* | 9/2020 | Torii | B25J 9/1661 |
| 2021/0094423 | A1* | 4/2021 | Moon | G05D 1/0293 |
| 2021/0284485 | A1* | 9/2021 | Nichols | B66B 1/468 |
| 2024/0094746 | A1* | 3/2024 | He | G05D 1/69 |
| 2024/0208592 | A1* | 6/2024 | Reyes Yazquez | B62D 33/08 |
| 2024/0408762 | A1* | 12/2024 | Landernäs | G05B 19/4189 |

OTHER PUBLICATIONS

JP 2003-291083 A, Robot Device, Robot Controlling Method, and Robot Delivery System, Hashimo-to et al., Filed: Mar. 28, 2002 Pub: Oct. 14, 2003, English Translation (Year: 2003).*

Chaudhari, et al., "A Review on Management of Logistics using Swarm Robotics", International Conference on Communication and Signal Processing (ICCSP), IEEE, 2016, 3 pages.

Dr. Shen, "HORMCOMM: Hormone-Inspired Cooperative Communication", University of Southern California, Information Sciences Institute, 2003, 31 pages.

Ferrer, et al., "Secure and secret cooperation in robot swarms", arXiv preprint, 2021, 43 pages.

Low, et al, "Autonomic Mobile Sensor Network with Self-Coordinated Task Allocation and Execution", IEEE Transactions on Systems, Man, and Cybernetics, Part C: Applications and Reviews, vol. 36, No. 3, 2006, pp. 315-327.

Senanayake, et al. "Search and tracking algorithms for swarms of robots: A survey", Robotics and Autonomous Systems 75, 2016, pp. 422-434.

Aupperlee Aaron. "Cmu Researchers Develop Algorithm To Divvy Up Tasks for Human-Robot Teams", retrieved from https://www.cs.cmu.edu/news/2022/act-delegate-learn, May 24, 2022, 3 pages.

Carnegie Mellon University. "New Algorithm Optimally Divvies up Tasks for Human-Robot Teams", SciTech daily, retrieved from https://scitechdaily.com/new-algorithm-optimally-divvies-up-tasks-for-human-robot-teams/, May 24, 2022, 9 pages.

* cited by examiner

COOPERATIVE USE OF AUTONOMOUS MACHINES

BACKGROUND

The present invention relates in general to robots and other autonomous machines. More specifically, the present invention relates to systems and methods for manipulating objects using autonomous machines.

Various types of robotic systems are used in a large number of contexts, such as manufacturing, warehouse operations, three-dimensional printing and others. Automation of processes in such contexts may require that robots and other autonomous machines be able to handle a wide variety of materials and objects. In some cases, cooperative operation of multiple autonomous machines, such as robots, automated vehicles and other automated equipment, is desirable.

SUMMARY

Embodiments of the invention are directed to a computer-implemented method that includes analyzing an object to be manipulated by a primary autonomous machine, the analyzing including determining one or more operations to be performed to manipulate the object for a desired purpose. The method also includes, based on the analyzing, determining whether the primary autonomous machine has a capability sufficient to perform the one or more operations and realize the desired purpose, based on determining that the capability is not sufficient, requesting assistance from a secondary autonomous machine, and performing the one or more operations by the primary autonomous machine in cooperation with the secondary autonomous machine.

Embodiments of the invention are also directed to computer systems and computer program products having substantially the same features as the computer-implemented method described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
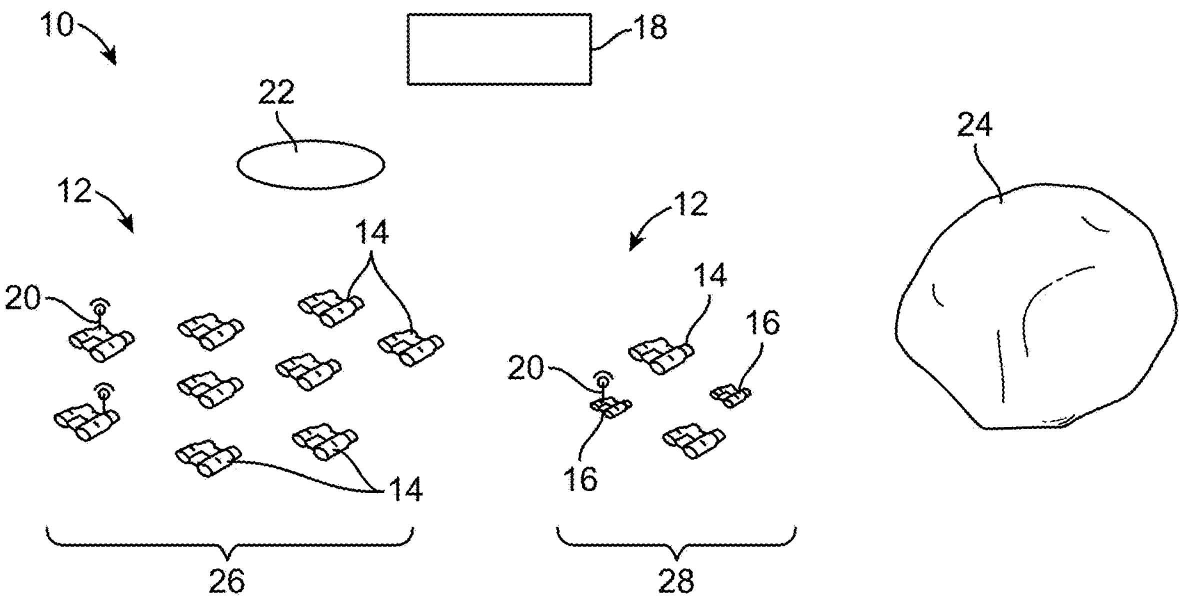
FIG. 1 depicts an embodiment of an autonomous machine system including a plurality of autonomous machines, in accordance with embodiments of the invention.

In the accompanying figures and following detailed description of the disclosed embodiments, the various elements illustrated in the figures are provided with three-digit reference numbers. In some instances, the leftmost digits of each reference number correspond to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of aspects of the invention, embodiments of the invention provide systems, computer-implemented methods, and computer program products for cooperative operation of autonomous machines. An embodiment of a system includes one or more autonomous machines (e.g., swarm robots) configured to perform various operations (e.g., lifting, dragging, moving, etc.) to manipulate an object. The one or more autonomous machines are referred to herein as "primary" autonomous machines or robots, which are capable of communicating with each other by direct communication or through a centralized processor or control system.

The primary autonomous machines (or control system) are configured to receive instructions to manipulate an object for a desired purpose. Based on the instructions and properties of the object (e.g., size, dimensions, material composition, etc.), the primary machines or the control system determines operations to be performed (e.g., lifting, moving) to achieve the desired purpose. The operations are compared to the capabilities of each primary machine. If it is determined that the operations exceed the capability of the primary machines (e.g., the primary machines' lifting capability is exceeded due to the weight of the object), one or more of the primary machines (or the control system) communicates with at least one secondary autonomous machine (e.g., helper robot) and requests assistance. Based on the request, at least one secondary machine cooperates with the primary machines to enhance their capabilities and perform the operations cooperatively to achieve the desired purpose.

In an embodiment, the operations are monitored and a determination as to whether help is desired or needed is performed continuously or periodically during manipulation (e.g., in real time). If at any point it is determined that the operations exceed the capability of the primary machines, the primary machines or control system requests assistance from one or more secondary machines.

Embodiments of the invention described herein present numerous technical benefits and effects. For example, embodiments improve efficiency and effectiveness of autonomous and/or robotic systems by providing a decentralized approach that allows for flexibility and real time adjustments that increase efficiency. In addition, embodiments can be realized without the need for direct human control, which further increases efficiency.

FIG. 1 depicts an embodiment of a system 10 for manipulating objects. As described herein, "manipulating" refers to any action or function performed on an object in order to change a condition of the object. Examples of conditions include position, orientation, state of manufacture (e.g., manipulating may be adding, subtracting or substituting a component or material), movement direction, speed and others. As described herein, an "object" refers to any physical entity or collection of physical entities that can be manipulated to achieve a desired purpose. Examples include components used to assemble or manufacture a product, packages in a warehouse, etc.

The system 10 includes a fleet 12 of autonomous machines that are configured to be able to work cooperatively to perform various tasks and operations. The fleet may include any number and combination of types of robots or other machines. For example, the fleet 12 includes a set of swarm robots, which may have the same dimensions and capabilities, or include a variety of robots having different dimensions and/or capabilities.

In the embodiment of FIG. 1, the fleet 12 includes a plurality of mobile robots 14 having a first size or dimensions, and a plurality of smaller dimension robots 16 having a size or dimension that is less than the first size or dimensions. Each robot 14 and 16 has capability to communicate with other robots in the fleet and/or with a control system 18. The control system 18 may be a workstation, server or other processing device or system. For example, each robot 14 and 16 includes a wireless transceiver 20 that enables wireless communication with one another (e.g., via a local network or near field communication) and with the control system 18 (e.g., via a network 22, such as a cloud network).

The robots 14 and 16 are capable of performing various functions for manipulating an object 24. For example, the robots 14 and 16 may be able to perform lifting functions to lift objects, movement function (e.g. carry, push, pull, drag, etc.) and others. The robots 14,16 may cooperate as independent units or physically couple together to form a composite robot or composite machine.

In the example of FIG. 1, the machines are mobile robots that are movable via wheels or tracks. However, this example is not intended to be limiting, as any suitable types or robots and machines may be used. Examples of other types of machines include mobile machines, such as wheeled robots, autonomous vehicles (e.g., autonomous trucks, forklifts, etc.), robots that move via limbs, humanoid robots, snake robots and others. Other examples include stationary machines such as robotic arms, conveyors, and others.

As discussed further herein, the robots 14,16 and/or the control system 18 evaluates a task or operation to be completed, and determines a number and/or type of robots that are to be employed. For example, the control system 18 selects a primary set 26 (e.g., at least one) of robots that will cooperate to initiate manipulating the object 24. Other available robots may be held in reserve or otherwise be available for use. The other robots are referred to as secondary or helper robots, shown as part of a secondary set 28.

The helper robots may have various capabilities. In the example of FIG. 1, the helper robots can have lifting, pushing and/or dragging capabilities, as well as the ability to have the object 24 rest upon one or more robots and be carried. These support capabilities are exemplary and not intended to be limiting, as helper robots can be configured to provide other support functions. Examples of such support functions include lift support (e.g., via aerial vehicle or machine, manipulator, etc.), horizontal drag support (like force, speed, etc.), provision of additional or advanced sensors and monitoring capabilities (e.g., have sensors such as optical cameras, infrared cameras, radar, lidar and others), specialized manipulating capabilities (e.g., a special robotic hand), and provision of additional resources for the context of an operation.

For example, the control system 18 evaluates the object 24 and selects a group of robots that each are smaller than the object 24 and will work cooperatively to move the object 24. In this example, the robots 14 of the primary set 26 are tasked with moving the object 24 along a desired movement path through a passage. Based on factors such as the center of gravity and the weight of the object 24, and the relative size of the object 24 and passage, a group of robots 14 are selected that are expected to be able to move through the passage with the object.

Figure 2:
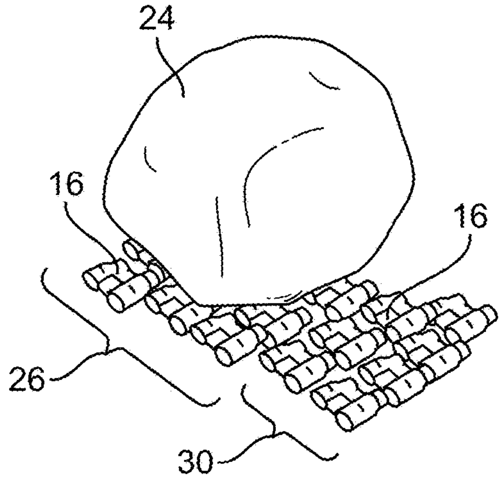
FIG. 2 depicts the autonomous machine system of FIG. 2 perform aspects of an operation that includes manipulating an object, in accordance with embodiments of the invention.
Figure 3:
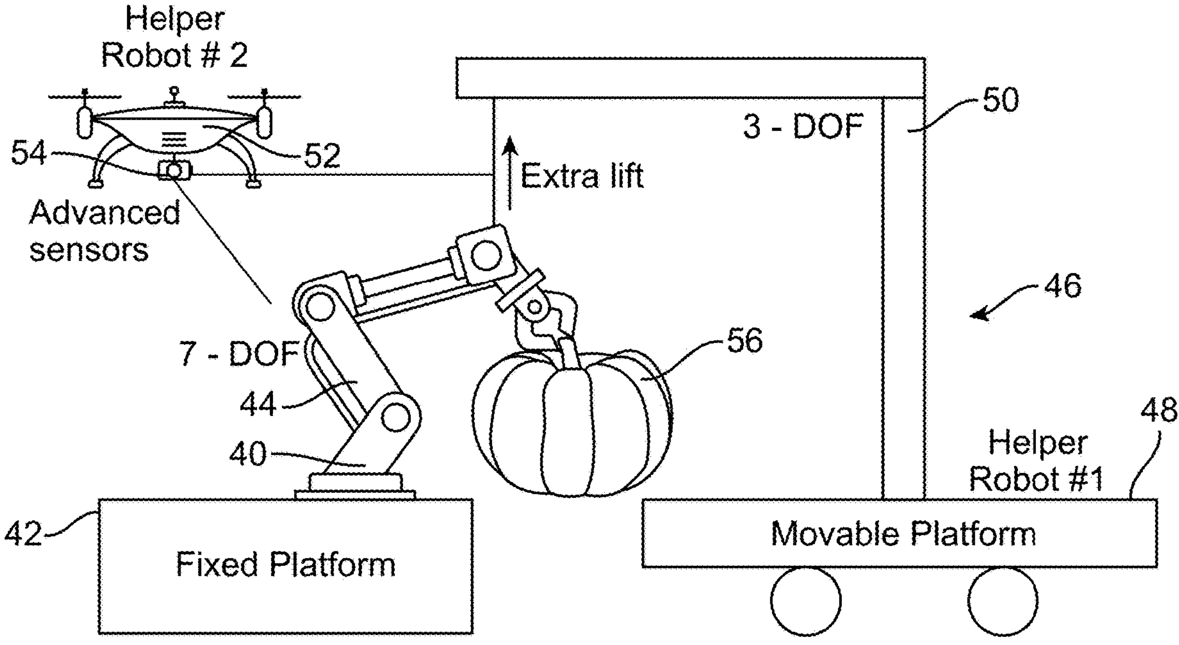
FIG. 3 depicts an embodiment of an autonomous machine system including a plurality of autonomous machines, the plurality of autonomous machines include a fixed position primary machine and one or more secondary or helper machines.

As shown in FIG. 2, the robots 14 of the primary set 26 dynamically couple together (e.g., by operating separately but in a coordinated manner, or physically coupling together) to form an appropriate configuration for lifting and moving the object 24. The robots 14 then work together to lift and support the object 24, and begin moving the object 24.

While the object 24 is being moved by the primary set 26 of robots 14, the object and the primary robots are monitored to determine whether conditions exist that would benefit from assistance by helper robots. For example, if the object speed is too slow, or the object 24 gets stuck, additional robots are recruited and added to the coupling. In the example of FIG. 2, the control system 18 determines that the existing group of robots needs support to provide additional moving force to the object. Based on this determination, additional helper robots 16 (denoted as group 30) are deployed and operate with the primary robots.

Other conditions may prompt the inclusion of helper robots. For example, if any of the primary robots malfunction or become damaged, one or more helper robots can be dynamically deployed. In another example, if sensors on the primary robots (or other sensing systems being used) do not provide sufficient information, one or more helper robots with cameras or other sensors can be deployed.

As noted above, the autonomous machines may be mobile machines such as autonomous vehicles or wheeled robots, and/or fixed machines. A fixed machine is any machine that is disposed at a fixed location when performing actions and manipulations.

Figure 4:
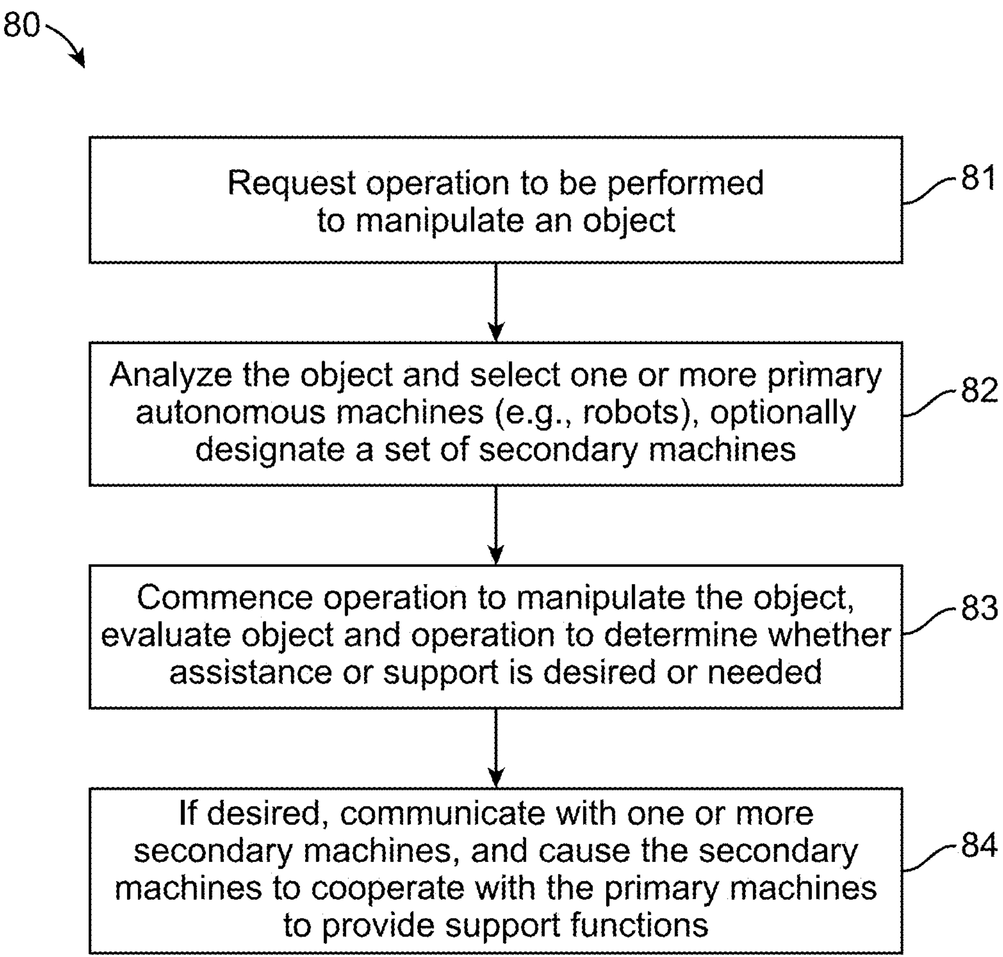
FIG. 4 depicts a flow diagram illustrating a computer-implemented or computer-controlled method in accordance with embodiments of the invention.

FIG. 4 depicts an example in which the primary machine is a fixed manipulator robot 40 mounted on a fixed platform 42 and having an articulated arm 44 having seven degrees of freedom, which is used for lifting and moving an object. In this example, the robot 40 is part of a food processing plant and manipulates objects such as vegetables, other food products, packaging, etc.

In cases where the capabilities of the robot 40 are not sufficient for a given operation, one or more secondary helper robots are provided and may be activated to assist the primary robot 40. In this example, one helper robot 46 includes a moveable platform 48 mounted on wheels, and a lifting mechanism 50. Another helper robot 52 is an autonomously controlled (or controlled by a control system) aerial vehicle having a set of sensors 54.

The primary robot 40 is tasked with an object 56, such as a pumpkin. The robot 40 is designed to handle weights of up to 20 pounds (lbs). Occasionally, the robot 40 is tasked with manipulating a pumpkin or other object 56 that exceeds 20 lbs.

In such a scenario, the robot 40 detects that the object exceeds its lifting power. In response, the robot 40 communicates with the helper robot 46 to provide additional lift power. If needed, the robot 40 may also communicate with the helper robot 53 (aerial vehicle) to provide support for coupling the helper robot 46 with the primary robot 40. After coupling is complete, the helper robot 53 returns to a docking station or other reserve area. The primary robot 40, with the help of the helper robot 46, lifts and moves the object 56. The helper robot 46 may then disconnect from the primary robot and return to a reserve area.

As the occurrence of pumpkins over 20 lbs is not common, it may be inefficient to incur the additional cost to install larger and more costly robots. Thus, as is illustrated by this example, embodiments increase efficiency and reduce costs by employing smaller and less expensive helper robots to assist the primary robot 40.

FIG. 4 depicts a flowchart of a method 80 of manipulating an object according to an embodiment of the invention. The method 80 includes a number of steps or stages represented by blocks 81-84. It is noted that the method may include all of the steps or stages or fewer than all of the steps or stages.

The method 80 may be performed by any suitable computing device or system. For example, the method can be performed by the computer 101, the processor set 110 and/or the end user device 103.

The method 80 is discussed in conjunction with the control system 18 of FIG. 1 and the robots of FIGS. 1 and 2 for illustration purposes. However, the method is not so limited, as the method 80 can be used with any set of robots or other machines that can operate cooperatively.

At block 81, a desired action or operation is requested. The request may be in the form of an instruction from a control device (e.g., the control system of FIG. 1) or a user. For example, a user or control device receives planning information, and determines desired actions to be performed.

For example, the control system 18 determines that the object 24 of FIG. 1 is to be moved to a desired location. The control system 18 may determine a movement path, and may also assess the size of regions or passages that the object is to be moved through.

At block 82, a configuration of autonomous machines is selected. Selecting the configuration may include selecting a type and/or number of machines to perform the desired actions.

For example, the control system 18 evaluates available machines, such as a fleet of swarm robots, which may have different sizes and capabilities. The system selects a number of the robots that are expected to be able to complete the requested actions. Factors that may be considered when making this selection include, for example, time of completion, safety factors, comparative priority and others. Selection of robots may be based on historical data describing similar operations or purposes, machine learning and/or other suitable information.

For example, referring to FIG. 1, the control system 18 evaluates properties of the object 24 (e.g., size, dimensions, weight, etc.), as well as actions to be performed to achieve a desired purpose of moving the object 24 to a desired location (e.g., lifting, moving along a movement path, moving the object through a passage, disposing the object in a container, etc.). Based on these factors, the control system selects one or more of the robots 14, 16 as a primary set 26 of robots. Other available robots 14, 16 are designated as secondary robots (e.g., the secondary set 28).

Typically, the system will select the number and type of robots that can achieve the desired purpose in the most efficient manner (e.g., select a configuration that is low in cost and power usage, have space efficiency and are safe). These robots will be expected to be able to perform most of the operations by themselves as a team. However, conditions may arise that necessitate the need for additional help.

The control system and/or the robots may determine whether one or more helper machines or robots are desired or expected to be needed. This determination may be performed prior to commencing the manipulation or during an operation where the manipulation is performed. For example, a set of secondary or reserve machines (e.g., the secondary set 28 of FIG. 2).

At block 83, the control system and/or the robots determine whether additional help or support is needed or is expected to be needed. The control system and/or the robots monitor the operation as the object is being manipulated, and periodically or continuously evaluate whether the selected robots remain capable to perform the requested actions. In this way, the need for additional help is dynamically calculated in real time.

In the example of FIG. 1, the robots 14 in the primary group (and/or the control system 18) analyze the shape and dimensions of the object 24 that needs to be manipulated (before commencing the operation and/or during the operation). If applicable, the robots will analyze the movement path and/or sizes of passages or spaces that the object will be moved through. If the robots find it beyond their capability, they will be able to request help from other helper robots (which might be similar or different type of robots).

At block 84, if additional help is determined to be needed or desired, the control system and/or currently deployed robots communicate with one or more secondary robots, which may be similar to the deployed robots or different. One or more helper robots are requested and dynamically couple with the primary robots to complete the operation to solve the task.

The helper robots can provide support in various ways. They can act as part of the team by doing the same task that other robots are doing. For example, the helper robots can become part of a team to move a heavy object by each robot picking up the object to share the weight.

The helper robot can support one or multiple robots to enhance their capabilities. For example, if a robot needs more lifting power, the helper robot can provide it. In another example the helper robot can push/pull the robot to provide more drag power.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
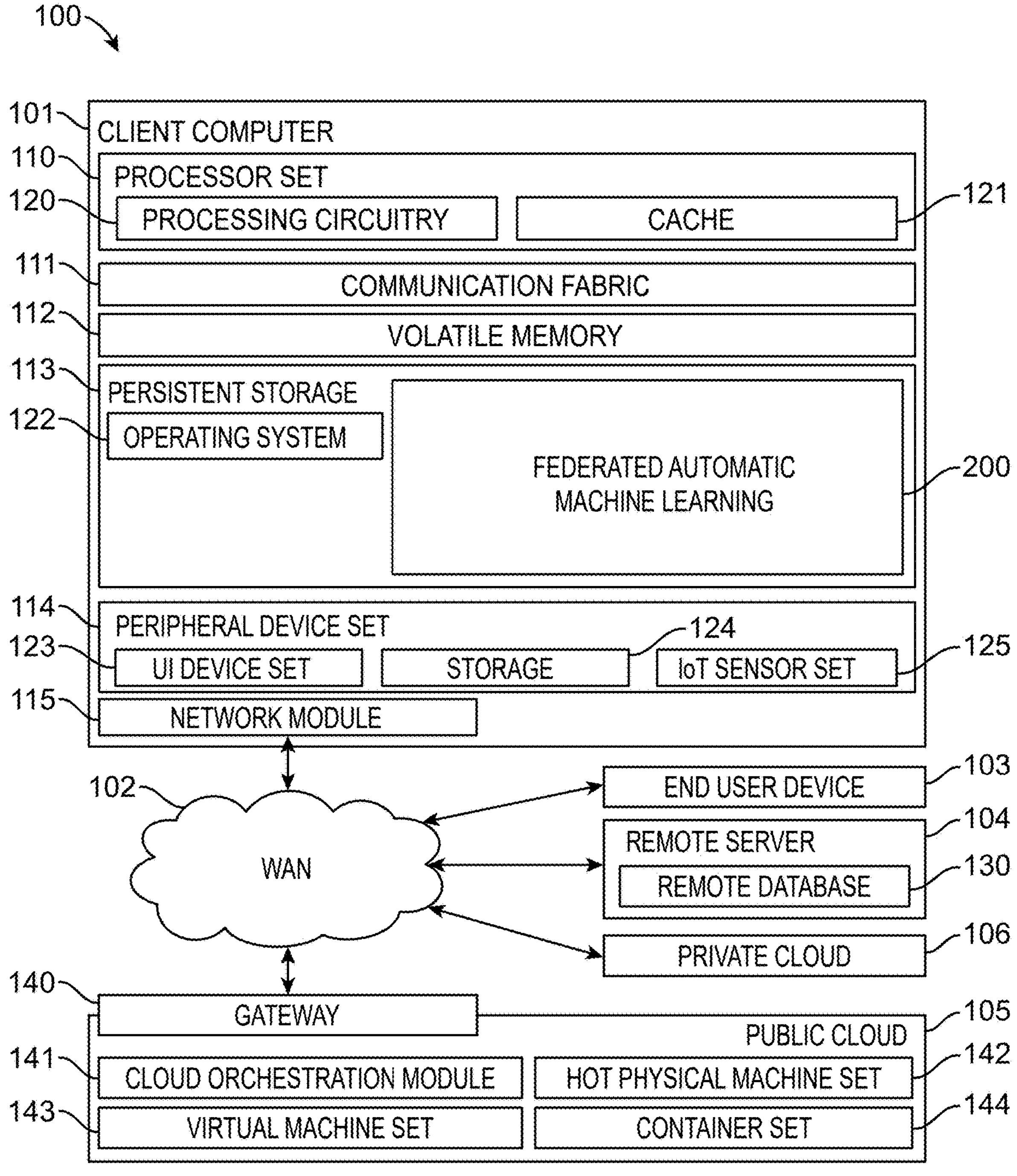
FIG. 5 depicts details of an exemplary computing environment operable to implement embodiments of the invention.

Referring now to FIG. 5, computing environment 100 contains an example of an environment for the execution of at least some of the computer code involved in performing the inventive methods, such as federated automatic machine learning 200 (referred to herein as block 200). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms “comprises,” “comprising,” “includes,” “including,” “has,” “having,” “contains” or “containing,” or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term “exemplary” is used herein to mean “serving as an example, instance or illustration.” Any embodiment or design described herein as “exemplary” is not necessarily to be construed as preferred or advantageous over other embodiments or designs. The terms “at least one” and “one or more” are understood to include any integer number greater than or equal to one, i.e., one, two, three, four, etc. The terms “a plurality” are understood to include any integer number greater than or equal to two, i.e., two, three, four, five, etc. The term “connection” can include both an indirect “connection” and a direct “connection.”

The terms “about,” “substantially,” “approximately,” and variations thereof, are intended to include the degree of error associated with measurement of the particular quantity based upon the equipment available at the time of filing the application. For example, “about” can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

analyzing an object to be manipulated by a primary autonomous machine, the analyzing including determining one or more operations to be performed to manipulate the object;

based on the analyzing, determining whether the primary autonomous machine has a capability to perform the one or more operations;

based on determining that the primary autonomous machine is not capable of performing the one or more operations, requesting assistance from a secondary autonomous machine, and communicating with a third autonomous machine to request support in physically coupling the primary autonomous machine with the secondary autonomous machine;

physically coupling the primary autonomous machine with the secondary autonomous machine, wherein the coupling is assisted by the third autonomous machine; and performing the one or more operations by the primary autonomous machine in cooperation with the secondary autonomous machine.

2. The computer-implemented method of claim 1, wherein the primary autonomous machine includes a plurality of autonomous machines configured to communicate with one another and coordinate operations to manipulate the object.

3. The computer-implemented method of claim 2, wherein the plurality of autonomous machines and the secondary autonomous machine are configured to physically couple with one another to form a composite machine.

4. The computer-implemented method of claim 2, wherein the plurality of autonomous machines each have a smaller dimension than the object, and the requesting assistance includes communicating with an additional smaller dimension autonomous machine to cause the additional smaller dimension autonomous machine to assist in manipulating the object synchronously with the plurality of autonomous machines.

5. The computer-implemented method of claim 1, wherein the third autonomous machine is a mobile machine.

6. The computer-implemented method of claim 1, wherein the secondary autonomous machine is configured to perform a support function that includes at least one of: directly manipulating the object, and performing an action on the primary autonomous machine to reinforce an operation performed by the primary autonomous machine.

7. The computer-implemented method of claim 1, wherein the primary autonomous machine is a fixed position manipulator, the secondary autonomous machine is a mobile machine, and the third autonomous machine is an aerial machine.

8. The computer-implemented method of claim 1, wherein the one or more operations include at least one of: providing lift support; providing horizontal drag support; providing sensor support; and providing special manipulating capabilities.

9. The computer-implemented method of claim 1, wherein the analyzing and the determining are performed continuously or periodically during manipulation of the object.

10. A system comprising:

a memory device; and one or more processing units coupled with the memory device, the one or more processing units are configured to perform a method including:

analyzing an object to be manipulated by a primary autonomous machine, the analyzing including determining one or more operations to be performed to manipulate the object;

based on the analyzing, determining whether the primary autonomous machine has a capability to perform the one or more operations;

based on determining that the primary autonomous machine is not capable of performing the one or more operations, requesting assistance from a secondary autonomous machine, and communicating with a third autonomous machine to request support in physically coupling the primary autonomous machine with the secondary autonomous machine;

physically coupling the primary autonomous machine with the secondary autonomous machine, wherein the coupling is assisted by the third autonomous machine; and performing the one or more operations by the primary autonomous machine in cooperation with the secondary autonomous machine.

11. The system of claim 10, wherein the primary autonomous machine includes a plurality of autonomous machines configured to communicate with one another and coordinate operations to manipulate the object.

12. The system of claim 11, wherein the plurality of autonomous machines and the secondary autonomous machine are configured to physically couple with one another to form a composite machine.

13. The system of claim 11, wherein the plurality of autonomous machines each have a smaller dimension than the object, and the requesting assistance includes communicating with an additional smaller dimension autonomous machine to cause the additional smaller dimension autonomous machine to assist in manipulating the object synchronously with the plurality of autonomous machines.

14. The system of claim 10, wherein the secondary autonomous machine is configured to perform a support function that includes at least one of: directly manipulating the object, and performing an action on the primary autonomous machine to reinforce an operation performed by the primary autonomous machine.

15. The system of claim 10, wherein the primary autonomous machine is a fixed position manipulator, the secondary autonomous machine is a mobile machine, and the third autonomous machine is an aerial machine.

16. The system of claim 10, wherein the analyzing and the determining are performed continuously or periodically during manipulation of the object.

17. A non-transitory computer program product comprising a computer-readable memory that has computer-executable instructions stored thereupon, the computer-executable instructions when executed by a processor cause the processor to perform operations comprising:

analyzing an object to be manipulated by a primary autonomous machine, the analyzing including determining one or more operations to be performed to manipulate the object;

based on the analyzing, determining whether the primary autonomous machine has a capability to perform the one or more operations;

based on determining that the primary autonomous machine is not capable of performing the one or more operations, requesting assistance from a secondary autonomous machine, and communicating with a third autonomous machine to request support in physically coupling the primary autonomous machine with the secondary autonomous machine;

physically coupling the primary autonomous machine with the secondary autonomous machine, wherein the coupling is assisted by the third autonomous machine; and performing the one or more operations by the primary autonomous machine in cooperation with the secondary autonomous machine.

18. The computer program product of claim 17, wherein the primary autonomous machine includes a plurality of autonomous machines configured to communicate with one another and coordinate operations to manipulate the object.

19. The computer program product of claim 17, wherein the secondary autonomous machine is configured to perform a support function that includes at least one of: directly manipulating the object, and performing an action on the primary autonomous machine to reinforce an operation performed by the primary autonomous machine.

20. The computer program product of claim 17, wherein the primary autonomous machine is a fixed position manipulator, the secondary autonomous machine is a mobile machine, and the third autonomous machine is an aerial machine.

* * * * *